(12) United States Patent
Bicksler et al.

(10) Patent No.: US 7,620,181 B2
(45) Date of Patent: Nov. 17, 2009

(54) COMMUNICATIONS SYSTEM WITH MINIMUM ERROR CRYPTOGRAPHIC RESYNCHRONIZATION

(75) Inventors: David M. Bicksler, Webster, NY (US); William S. Rogers, Webster, NY (US)

(73) Assignee: Harris Corporation, Melbourne, FL (US)

( * ) Notice: Subject to any disclaimer, the term of this patent is extended or adjusted under 35 U.S.C. 154(b) by 997 days.

(21) Appl. No.: 11/110,378

(22) Filed: Apr. 20, 2005

(65) Prior Publication Data

US 2006/0239458 A1 Oct. 26, 2006

(51) Int. Cl.
*H04N 7/167* (2006.01)

(52) U.S. Cl. .................................... 380/221; 726/22

(58) Field of Classification Search ................ 380/221
See application file for complete search history.

(56) References Cited

U.S. PATENT DOCUMENTS

| | | | | |
|---|---|---|---|---|
| 4,757,536 A | | 7/1988 | Szczutkowski et al. | 380/48 |
| 4,803,726 A | | 2/1989 | Levine et al. | 380/48 |
| 4,817,146 A | | 3/1989 | Szczutkowski et al. | 380/48 |
| 4,977,596 A | | 12/1990 | Maestas et al. | 380/48 |
| 5,060,266 A | | 10/1991 | Dent | 380/49 |
| 5,081,679 A | | 1/1992 | Dent | 380/48 |
| 5,369,706 A | | 11/1994 | Latka | 380/23 |
| 5,784,362 A | * | 7/1998 | Turina | 370/321 |
| 5,892,924 A | * | 4/1999 | Lyon et al. | 709/245 |
| 6,018,530 A | * | 1/2000 | Chakravorty | 370/471 |
| 6,108,421 A | | 8/2000 | Kurdziel et al. | 380/28 |
| 6,178,448 B1 | * | 1/2001 | Gray et al. | 709/224 |
| 6,216,183 B1 | * | 4/2001 | Rawlins | 710/100 |
| 6,249,582 B1 | | 6/2001 | Gilley | 380/28 |
| 6,977,896 B1 | * | 12/2005 | Kobayashi | 370/235 |
| 7,185,229 B2 | * | 2/2007 | Cromer et al. | 714/22 |
| 7,406,526 B2 | * | 7/2008 | Benchetrit et al. | 709/228 |
| 7,406,533 B2 | * | 7/2008 | Li et al. | 709/236 |
| 2002/0159598 A1 | | 10/2002 | Rubinstein et al. | 380/259 |
| 2003/0131233 A1 | | 7/2003 | Garstin et al. | 713/160 |
| 2003/0188148 A1 | | 10/2003 | Logalbo et al. | 713/150 |
| 2003/0206538 A1 | | 11/2003 | Rezaiifar et al. | 370/335 |
| 2004/0139336 A1 | | 7/2004 | McLean et al. | 713/189 |
| 2006/0056435 A1 | * | 3/2006 | Biran et al. | 370/412 |
| 2007/0162609 A1 | * | 7/2007 | Pope et al. | 709/230 |

* cited by examiner

*Primary Examiner*—Kambiz Zand
*Assistant Examiner*—Dant B Shaifer Harriman
(74) *Attorney, Agent, or Firm*—Allen, Dyer, Doppelt, Milbrath & Gilchrist, P.A.

(57) ABSTRACT

A synchronized communications system permits resynchronization in late-entry or fade-recovery conditions. A plurality of communications devices are operative for communicating in a synchronized, encrypted communications channel between each other. At least one of the communications devices is operative for continuously transmitting a resynchronization header that includes a start-of-message field that includes voice or data message information type, a message indicator field, a synchronization check field, a first error correction field computed over the start-of-message/message indicator/synchronization fields, a frame index field and a second error correction field computed on the frame index field. Receivers monitor the channel to decode these headers to perform late-entry or fade recovery.

29 Claims, 6 Drawing Sheets

COMMUNICATIONS SYSTEM WITH MINIMUM ERROR CRYPTOGRAPHIC RESYNCHRONIZATION

FIELD OF THE INVENTION

The present invention relates to communications systems and, more particularly, the present invention relates to encrypted radio communications systems with minimum corruption to voice or data traffic caused by late-entry or fade-recovery conditions.

BACKGROUND OF THE INVENTION

There are many different techniques for encrypting communications, and especially wireless communications used with mobile radios, for example, high frequency (HF), very high frequency (VHF) or ultra high frequency (UHF) mobile radios. Some of these encryption techniques require cryptographic synchronization between transmit and receive mobile radios. Examples of mobile radios that support encrypted radio transmissions and require cryptographic synchronization include various radios manufactured by the assignee of the present invention, Harris Corporation of Melbourne, Fla., including the tactical mobile radio sold under the designation Falcon® II. These tactical mobile radios are often manufactured as a multiband manpack or handheld, and often used in the field as Combat Net Radios (CNR) in harsh communications networks, for example, an Integrated Tactical Area Net System (ITACS), which provides secure voice, data and video services to tactical users, using IP data and VOIP voice processing and other network benefits. Many of these mobile radios support extended range communications with the use of repeater networks. For example, different communications networks, such as FalconNet produced by the assignee of the present invention, Harris Corporation, supports wide area communications via repeaters.

Examples of cryptographic encryption circuits used in mobile radios include the Citadel Cryptographic Engine, as manufactured by Harris Corporation of Melbourne, Fla., which uses cryptographic algorithms based on a mixed-mode, arithmetic block cipher that can provide half-duplex encryption and decryption at through-put rates up to 5 Mbps. This circuit can process serial or parallel encrypted Ciphertext (CT) data. Interfaces are typically 3.3 volts and 5 volts CMOS compatible. The cryptographic algorithms can be customized. Although encryption is supported, often a receiver cannot receive a radio transmission that has already started, i.e., a late-entry condition, or recover from a signal loss of a few seconds, i.e., a fade-recovery condition. Thus, many mobile radios that use a standard minimum error (MINERR) cryptographic mode are not able to resynchronize in a late-entry or fade-recovery condition. This applies even to a minimum cryptographic mode, such as a 1-bit, error-out, for a 1-bit, error-in mode, which has transaction security (TS), such that the transmitter and receiver must be aligned on cryptographic blocks.

To achieve transaction security, cryptographic systems often do not encrypt data with the key to the same result each time. Indeed, these systems often use an internal cryptographic state to randomize the cryptographic data output. This state must be transmitted with the message for the receiver to be able to be encrypted. When a transmitter and receiver are not synchronized, however, the transmitter and receiver will have different cryptographic states that must be resynchronized in order to encrypt subsequent data to be received and understood at a receiver. As a result, many cryptographic resynchronization methods and systems cannot operate when a channel has bit errors above a very low level, and as a result, lose cryptographic synchronization in noisy channels. Many of these resynchronizing cryptographic systems also cannot operate with late-entry or fade-recovery conditions.

SUMMARY OF THE INVENTION

In view of the foregoing background, it is therefore an object of the present invention to provide a communications system that can resynchronize a cryptographic data stream across a communications channel having bit errors created by late-entry or fade-recovery conditions.

It is yet another object of the present invention to provide a communications system that can support late-entry or fade-recovery into an encrypted radio transmission in a noisy channel with minimum corruption to the voice or data traffic.

The present invention is directed to an encrypted radio communications system, method and resynchronization header that can resynchronize a cryptographic data stream across a communications channel even with bit errors such as created by a late-entry or fade-recovery condition.

The system and method supports late-entry or fade-recovery into an encrypted radio transmission in a noisy channel with minimum corruption to the voice for data traffic. Once a transmission is acquired, normal levels of channel noise will not cause loss of encryptographic synchronization. The present invention uses a unique cryptographic resynchronization header that includes a start-of-message field that includes voice or data message infotype, a message indicator field, a synchronization check field, and an error correction field that is computed over the start-of-message/message indicator and synchronization check fields. For example, the error correction could be a cyclic redundancy check.

The header also includes a frame index field that counts the number of headers sent, and two copies of an error correction, e.g., a cyclic redundancy check computed on the frame index. A resynchronization mode is interoperable with regular ciphertext by dummy encrypting through plaintext headers from the transmit side and dummy decrypting through plaintext resynchronization headers on the receive side, even when the header information is not encrypted. It is possible to majority vote and increment the frame index integer. Late-entry can be determined from fade-recovery by using the transmitted message indicator/synchronization check and a saved copy. Majority voting can be used.

In accordance with the present invention, a synchronized communications system permits resynchronization in late-entry or fade-recovery conditions. A plurality of communication devices are operative for communicating in a synchronized encrypted communications channel between each other. At least one of the communications devices is operative for continuously transmitting a resynchronization header that includes a start-of-message field that includes voice or data message input type, a message indicator field, a synchronization check field, a first error correction field computed over the start-of-message/message indicator/synchronization fields, a frame index field, and a second error correction field computed on the frame index field. The error correction field can be formed as a cyclic redundancy check. The second error correction field can be formed as two copies of a cyclic redundancy check computed on the frame index field. Each cyclic redundancy check can be about two bytes. The frame index field can be an integer indicating the number of transmitted headers.

The communication devices can be operative for dummy encryption through plaintext headers on the transmit side and dummy decrypting through claim text resynchronization headers on a receive side. The communication devices can be operative for reforming the resynchronization header as an even multiple of a ciphertext block size. Communication devices can also be operative for majority voting. An integer can be incremented along with frame index error corrections to validate an integer within the frame index field. Late-entry and fade-recovery conditions can be determined using the message indicator and synchronization check fields. A method and cryptographic resynchronization header are also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention supports resynchronizing of cryptographic data in an encrypted radio transmission in a noisy channel with minimum corruption to any voice or data traffic, even with late-entry or fade-recovery conditions. Once a transmission is acquired, normal levels of channel noise will not cause loss of cryptographic synchronization. Many other cryptographic resynchronization systems and methods usually do not operate when a communications channel has bit errors above a low level, and as a result, these systems lose cryptographic synchronization in noisy channels. Non-resynchronizing cryptographic systems cannot recover in late-entry or fade-recovery conditions. The present invention permits resynchronizing of encrypted radio communications in late-entry and fade-recovery conditions. The present invention is applicable not only to encryption using the Citadel cryptographic engine manufactured by Harris Corporation or Melbourne, Fla., but also to any minimum error cryptographic mode such as 1-bit, error-out for 1-bit, error-in mode having transaction security (TS), where the transmitter and receiver must be aligned on cryptographic blocks. The system and method of the present invention can be used in other communications applications as well.

The system and method of the present invention supports late-entry or fade-recovery into an encrypted radio transmission in a noisy channel with minimum corruption to the voice for data traffic. Once a transmission is acquired, normal levels of channel noise will not cause loss of encryptographic synchronization. The present invention uses a unique cryptographic resynchronization header that includes a start-of-message field that includes voice or data message infotype, a message indicator field, synchronization check field, an error correction field that is computed over the start-of-message/message indicator and synchronization check fields. For example, a cyclic redundancy check can be computed over the start-of-message, message indicator and synchronization check field.

The header also includes a frame index field that corresponds to the number of headers sent, and two copies of an error correction such as a cyclic redundancy check computed on the frame index. A resynchronization mode is interoperable with regular ciphertext by dummy encrypting through plaintext headers from the transmit side and dummy decrypting through plaintext resynchronization headers on the receive side, even when the header information is not encrypted. It is possible to majority vote and increment the frame index integer. Late-entry can be determined from fade-recovery by using the transmitted message indicator/synchronization check and a saved copy. Majority voting can be used.

The system and method of the present invention can use plaintext (PT) or a ciphertext (CT), e.g., Citadel encryption such as described below in greater detail with reference to FIG. 4. Any cryptography could be an exportable Citadel encryption or a Type-1 encryption or other similar encryption. Cryptography adds COMSEC (Communications Security) to TRANSEC (Transmission Security). Dual frequency hopping hopset repeaters can retransmit voice, data, or mixed transmission with TRANSEC and COMSEC offering the advantages associated with these types of systems. Retransmission of higher-level protocols over frequency hopping waveforms is also supported, for example, Directed Calling and wireless IP, which would be difficult to support in any rebroadcast mode where the retransmitter and original transmitter may compete for frequencies. A hopping repeater configuration can be implemented to allow clear separation between any receive and transmit communications when there is a chance of a radio frequency (RF) collision. In these examples, the mobile radios can be typically Combat Net Radios (CNR) and operable within a Combat Net Radio communications network, for example, as described below in greater detail with reference to FIG. 2.

Figure 1:
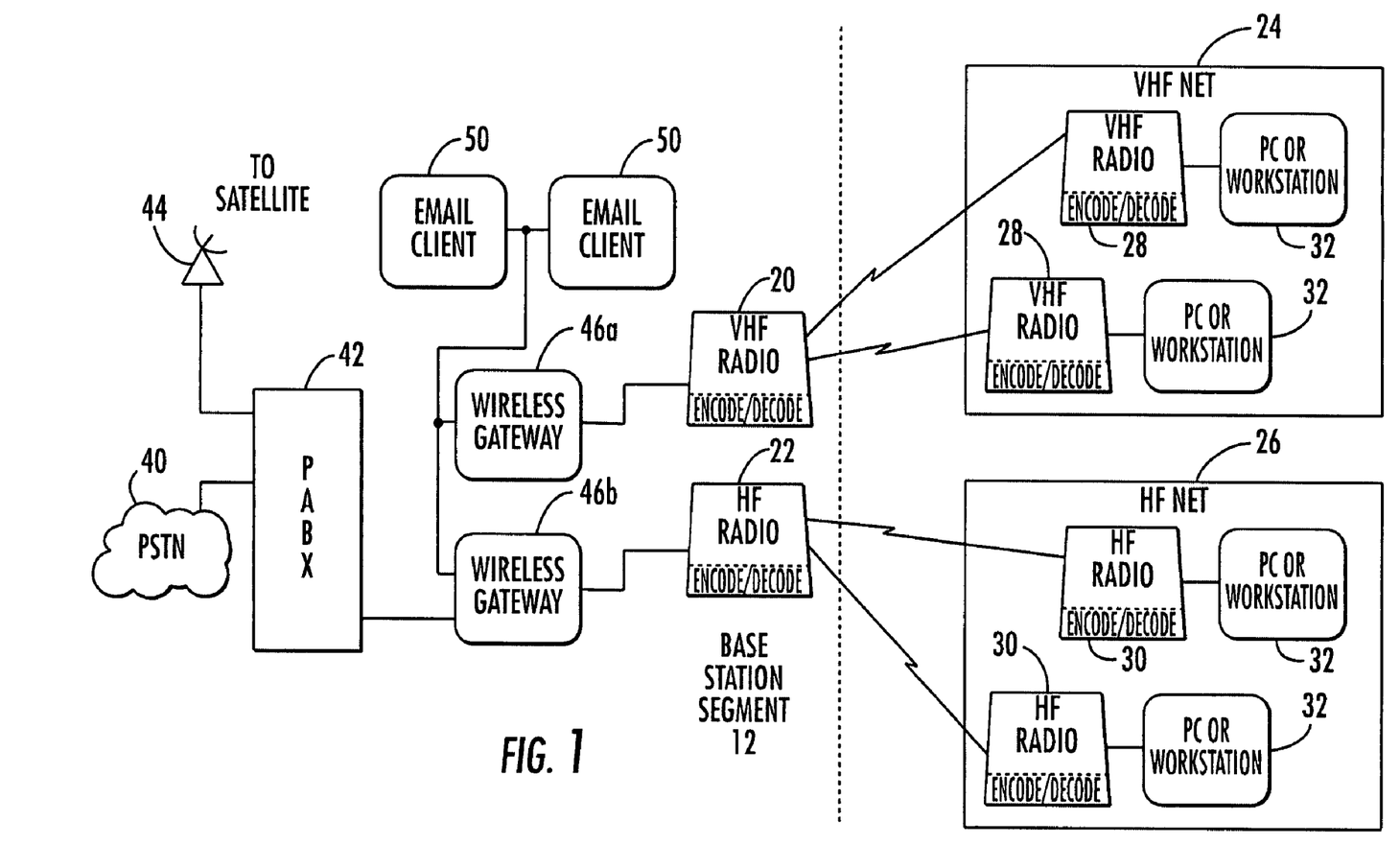
FIG. 1 is a block diagram of a communications system that can be used with the encrypted radio communications system and method of the present invention as a non-limiting example.

For purposes of understanding the present invention, a brief description of the type of communications system that can be used with an encrypted radio communications system of the present invention is described relative to a non-limiting example shown in FIG. 1. This high-level block diagram of a communications system 10 includes a base station segment 12 and wireless message terminals that could be modified for use with the present invention. The base station segment 12 includes a VHF radio 20 and HF radio 22 that communicate and transmit voice or data over a wireless link to a VHF net 24 or HF net 26, each which include a number of respective VHF mobile radios 28 and HF mobile radios 30, and personal computer workstations 32 connected to the radios 28, 30. The VHF mobile radios can include appropriate decode/encode circuits, a modem, and two transceiver circuits, which could be operable at different frequency hopping hopsets. Other circuits for interference suppression could be included, and appropriate firmware and hardware operative for the invention. These circuits could operate to perform the functions necessary for the present invention. Other illustrated radios can have similar circuits.

The base station segment 12 includes a landline connection to a Public Switched Telephone Network (PSTN) 40, which connects to a Private Automatic Branch Exchange (PABX) 42. A satellite interface 44, such as a satellite ground station, connects to the PABX 42, which connects to processors forming wireless gateways 46a, 46b. These interconnect to the VHF radio 20 or HF radio 22, respectively. The processors are connected through a local area network to the PABX 42 and e-mail clients 50. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and mobile radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538. It is also possible to use a fixed, non-adaptive data rate as high as 19,200 bps with a radio set to ISB mode and an HF modem set to a fixed data rate. It is possible to use co-combining techniques and ARQ.

An example of tactical mobile radios that can be used for the present invention with modification is the Falcon® II family of mobile radios that are software-based radios that can include embedded Citadel type-1 or other encryption, extended frequency range, advanced data capabilities, and other benefits, including advanced, high-speed modems with automatic voice/data detection and error-free transmission modes. A non-limiting example of such a mobile radio is a Falcon II AN/PRC-117F(C) sold by Harris Corporation as a multiband manpack radio with NSA-certified, type-1 security module. This type of mobile radio allows ground-ground, ground-air, and ground-satellite communications. It complies with SINCGARS, Havequick, and UHF TACSAT standards, and includes a programmable platform and software upgradeables. The TACSAT operation supports single-channel and Demand-Assigned Multiple-Access (DAMA) modes. Other types of mobile radios can include diplexed antenna outputs for high-gain, band-specific antennas, DC power filtering, a removable keypad/display unit, and Automatic Link Establishment (ALE).

Another non-limiting example of VHF radio applicable with modification for use with the present invention is the Falcon II RF-5800V very high frequency manpack or handheld portable. This advanced digital Combat Net Radio (CNR) includes advanced 64 KBPS data capability that allows other Internet Protocol (IP)-based applications to run in the background of normal voice traffic. It preferably uses Quicklook frequency-hopping algorithms and provides hopping at rates over 300 hops per second. It can use a Citadel encryption scheme to secure communications and include an embedded GPS receiver to provide local position information. This mobile radio is operable as a 64-KBPS unit with a 10-watt output to extend range for a 30-108 MHz extended frequency range. Secure-channel scanning can be provided with a removable keypad/display unit, automatic whisper operation, secure-channel scanning, and a built-in speaker/microphone. A power amplifier can be operative with a network access hub, such as the RF-6010 network access hub manufactured and distributed by Harris Corporation, as one non-limiting example.

Figure 2:
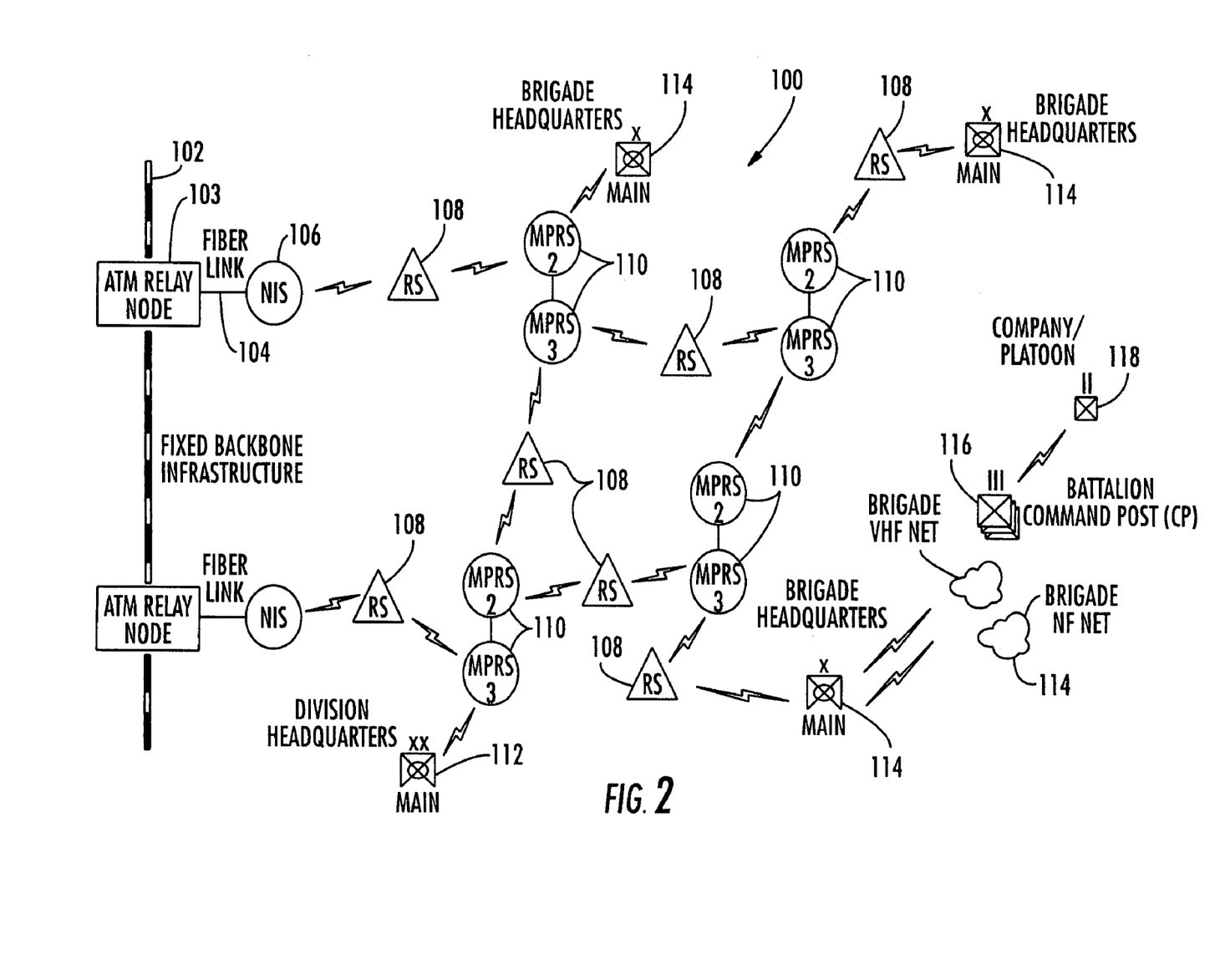
FIG. 2 is a fragmentary, block diagram of an Integrated Tactical Area Network system (ITACS) that can incorporate the system and method of the present invention.
Figure 3:
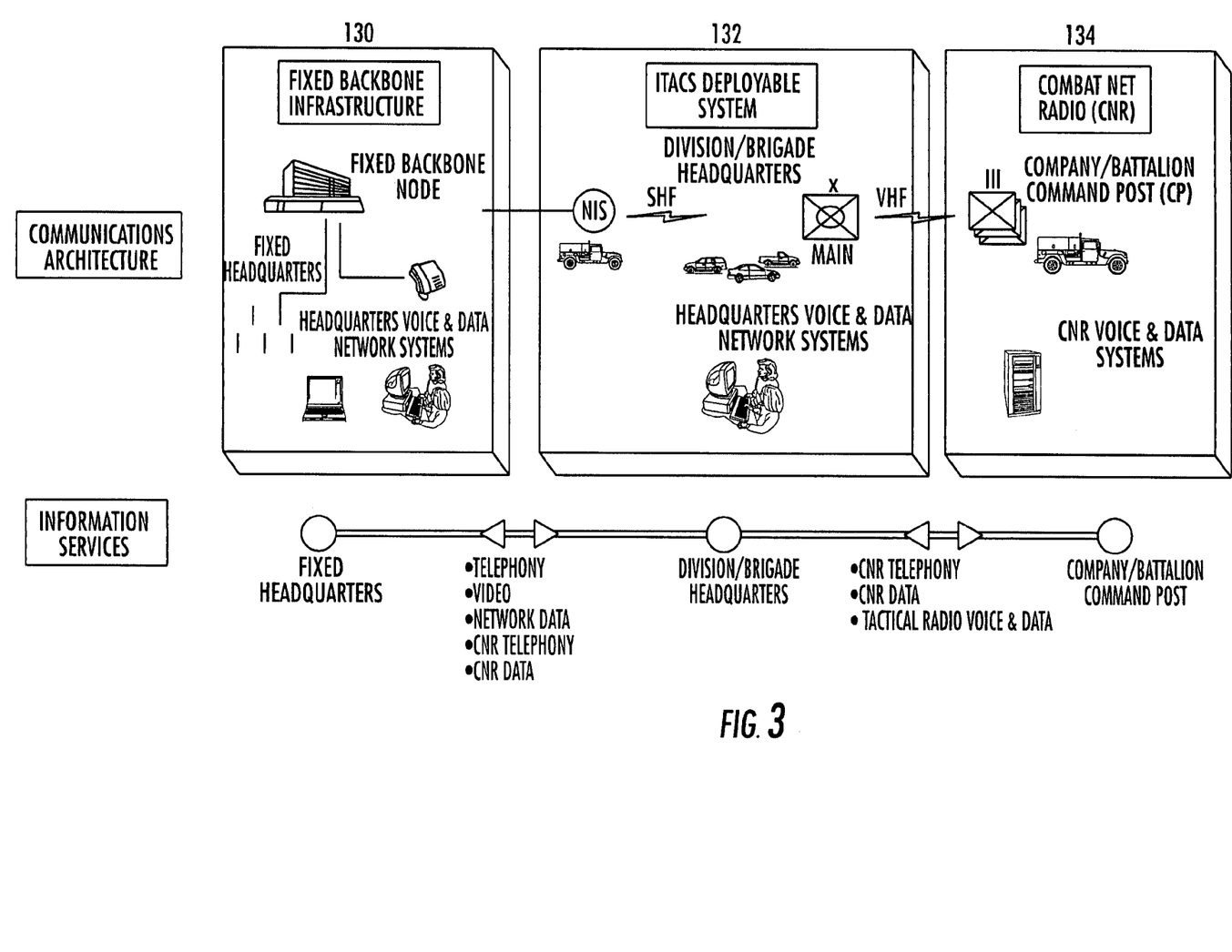
FIG. 3 is a block diagram showing a communications architecture and information services as a non-limiting example of the different systems, infrastructure and Combat Net Radio (CNR) that can be used with the present invention.

FIGS. 2 and 3 show a type of network and communications architecture and information that could be used with the present invention. This non-limiting example for an application of the present invention is an Integrated Tactical Area Network System (ITACS) that is becoming more commonplace for some tactical operations.

The ITACS system 100 shown in FIG. 2 is a communications system providing secure voice, data and video services to tactical users. Major components include a fixed backbone infrastructure 102 and ATM relay nodes 103 with a fiber link 104 to network interface stations 106, and tactical links such as an SHF or HF/VHF link to relay stations 108 and multipoint relay stations 110. Various Division 112, Brigade 114, Battalion 116 and Company/Platoon 118 headquarters/posts are shown with platoon/company/battalion command posts operative with Combat Net Radio voice and data systems. The system 100 can use IP data and VOIP voice processing to provide full command, control, communications, computer and information ($C^4I$) facilities to both command and subordinate units. The typical ITACS system 100 can be designed for division and brigade level command users.

The system 100 uses a modular design and is able to develop and maintain a fully scalable mobile communications network that can be changed in near real time in order to meet the mission requirements. The deployment may vary from support of a full divisional deployment down to the deployment of a single brigade.

The use of IP as a packet-based technology allows a natural sharing of network service and true convergence of voice, data and network control traffic. ITACS 100 provides seamless voice and data exchange across local and wide area networks, telecom networks, and combat net radio (CNR) communications networks. ITACS 100 also uses state-of-the-art commercial-off-the-shelf (COTS) equipment to connect to existing static communications infrastructure. The COTS hardware is very flexible and allows ITACS to interoperate with legacy communications systems with relative ease.

A typical ITACS deployment supports area communications to divisional and brigade headquarters. Each field headquarters can be supported by a mobile trunked network system, which can additionally be interconnected to existing static telecommunications network architectures.

A tactical High Capacity Line-of-Site (HCLOS) radio system (SHF) can support deployed infrastructure and ensure seamless interoperability. By using the HCLOS radios in a meshed network, multiple communications paths are established to provide the necessary redundancy for critical links between command centers and deployed assets.

A Combat Net Radio Interface (CNRI) supports the seamless interoperability of voice telephony and data services from deployed Combat Net Radio (CNR) users to staff users at divisional and brigade headquarters.

The communication nodes can be designed into a variety of platforms (wheeled, tracked, armoured, etc.) depending on the requirements of the customer. The main system configurations include a Network Interfacing Station (NIS) 106. This station 106 could have strategic WAN interface nodes (telephony/data); E1/T1, ATM, E3/T3, FXO, ISDN, DSL, serial; single point tactical microwave; bulk data encryption; VOIP telephony access point; Falcon II combat net radio suite (HF/VHF/UHF); and RF-6010 tactical network access hub.

Relay and Multi-Point Relay Stations (RS/MRS) 108, 110 could include a tactical microwave radio relay station (HCLOS); bulk data encryption (MRS only); data network switching/routing (MRS only); VOIP telephony access point (MRS only); Falcon II combat net radio suite (HF/VHF/UHF); and RF-6010 tactical network access hub (MRS only).

Any Division/Brigade/Battalion Command Station (DCS/BCS) 112, 114, 116 can include single/multi-point tactical microwave (HCLOS); bulk data encryption; data network switching/routing; VOIP telephony access point; Falcon II combat net radio suite (HF/VHF/UHF); RF-6010 tactical network access hub; and deployable command suite consisting of: (a) remotely deployable command tent (2 km fiber link); (b) command telephony switch (24/48 users); (c) $C^4$ data network facilities; (d) $C^2$ data facilities; (e) voice terminal equipment; (f) tactical video terminal equipment; (g) satellite communications terminal; and (h) support equipment.

The communications architecture and information services for an enlarged network system, including a number of Combat Net Radios, is illustrated in FIG. 3 and is only an example of a communications architecture and information services that can be used with the present invention. As illustrated, the fixed backbone infrastructure 130 may include fixed headquarters and headquarters voice and data network systems and a fixed backbone node. The ITACS deployable system 132 can include the Division/Brigade headquarters communications with the network interface stations 106 communicating via SHF with Division/Brigade headquarters 112, 114 with voice and data network systems. These communicate via VHF to a Combat Net Radio and its Company/Battalion command post with Combat Net Radio voice and data systems. The information services corresponding to the fixed backbone infrastructure 130 include a fixed headquarters with telephony, video, network data, combat net radio telephony and combat net radio data to the ITACS deployable system 132 and Division/Brigade headquarters which in turn is operable with a combat net radio 134 that is operable with combat net radio telephony, combat net radio data and tactical radio voice and data with the Company/Battalion command post.

It should be understood that the mobile radios used with the present invention are operable with different encryption systems and programmable cryptography modules such as disclosed in commonly assigned, U.S. Pat. No. 6,108,421, the disclosure which is hereby incorporated by reference in its entirety. These modules could include as non-limiting examples the Sierra and Sierra II programmable cryptographic modules manufactured and sold by Harris Corporation of Melbourne, Fla. The Sierra and Sierra II are programmable cryptographic modules operative as both a multimedia voice and data encryption module. Both modules are miniaturized printed wiring assemblies, and custom designed Application Specific Integrated Circuits (ASIC), which include supporting software. The modules are embedded in mobile radios such as described before and other voice and data communications equipment to encrypt classified information prior to transmission and storage.

The NSA-certified Sierra module is an embeddable encryption technology that combines the advantages of the government's high-grade security (Type I) with the cost efficiency of a reprogrammable, commercially produced Type 3 and Type 4 encryption module. The Sierra module can assume multiple encryption personalities depending on the mission, and provide encryption/decryption functionality, digital voice processing (vocoding) and cryptographic key management support functions.

Figure 4:
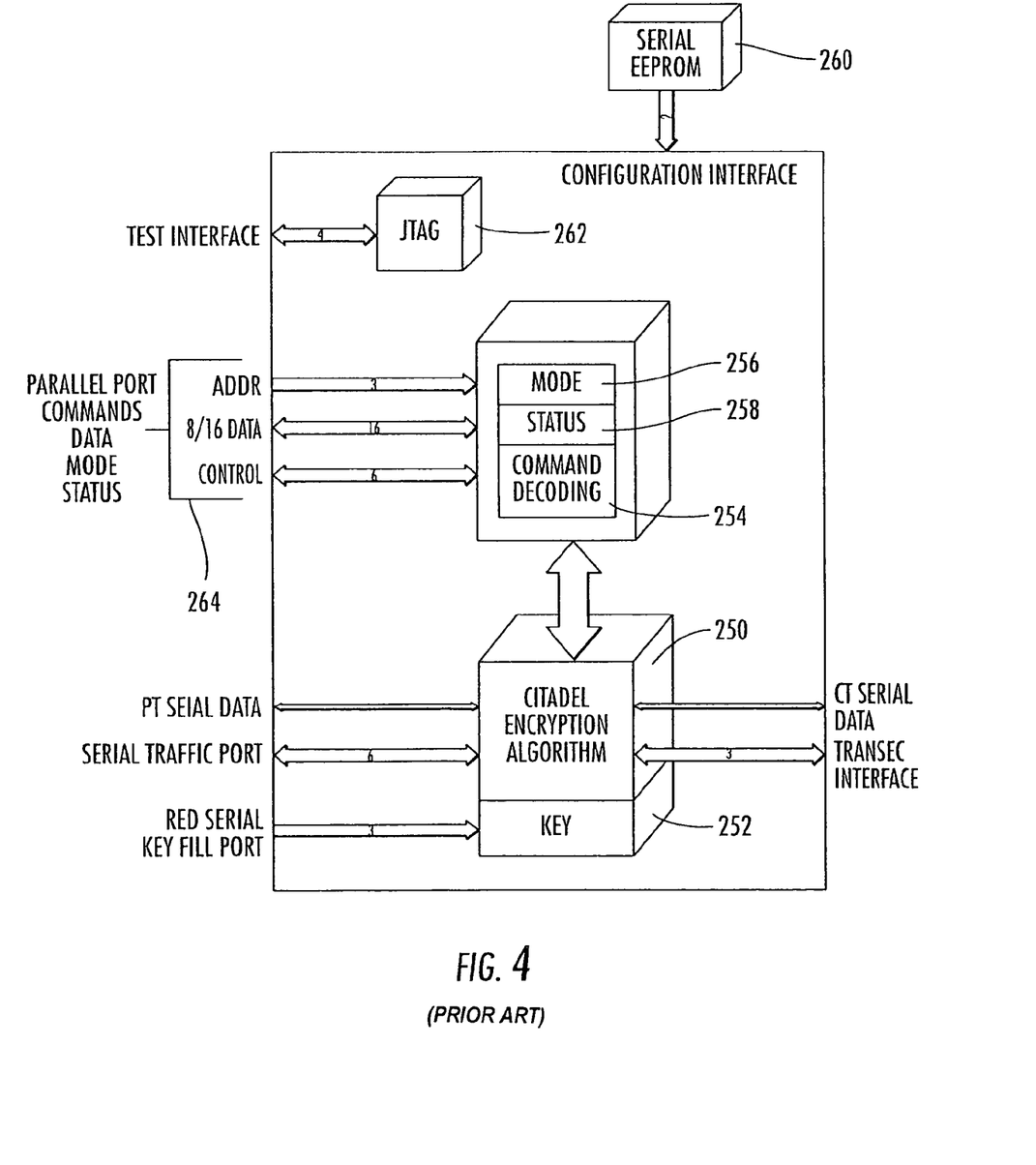
FIG. 4 is a block diagram illustrating the different operating components and functions of an encryption engine, such as the Citadel cryptographic engine.

FIG. 4 shows a block diagram of a Citadel cryptographic engine such as manufactured by Harris Corporation of Melbourne, Fla., which can be advantageously used with the encrypted radio communications resynchronization system, method and header of the present invention. It can be embedded into various communications media and has configurable key lengths. It can use a standard high-grade algorithm, a customer unique algorithm, or a customer-configurable unique algorithm. All algorithms are typically based on a mixed-mode, arithmetic block cipher and support both communication security (CS) and transmission security (TS) functions. It can provide half-duplex encryption and decryption at throughput data rates up to 5 Mbps per second and process serial or parallel unencrypted plaintext (PT) data in serial or parallel encrypted ciphertext (CT) data. Key management commands can be included in different integrated circuit command sets and provide flexibility. The interfaces are typically 3.3 volt and 5.0 volt CMOS compatible.

FIG. 4 illustrates the Citadel encryption algorithm 250 that includes various keys 252 and operable with command decoding 254 and mode 256 and status 258 functions. The configuration interface is operable with a serial EEPROM 260 and a test interface is operable with a JTAG circuit 262. The parallel port 264 is a bidirectional interface that controls circuit operation. Different commands, status bytes and command data are passed via this port 264 into an 8 or 16-bit format. Encryption and decryption can be processed using the parallel port in either an 8-bit or 16-bit format.

Plaintext (PT) serial data is encrypted into ciphertext (CT) serial data using the encryption algorithm 250. A serial traffic port is operable with a transmission security interface through the algorithm. The serial traffic port contains the data and control lines necessary for encryption and decryption. Plaintext and ciphertext data are located on different pins to provide red and black data separation. Keys 252 can be loaded using a red serial key fill port. A user-unique configuration information for the circuit can be read from the serial EEPROM 260 by the configuration interface or loaded using the parallel port. A housekeeping port can contain backslash reset, backslash zero, stand_alone, and config/deconfig signals. A test port can contain the test access port (TAP) interface for a boundary scan.

Because configurable key lengths can be used, it can be more secure against differential and linear cryptanalysis. Multiple cryptographic modes such as block cipher feedback, self-synchronizing cipher feedback, long cycle or minimum error propagation or code book as key processing can be used. Cryptographic keys can include a traffic encryption key-minimum $1.8\times10^{19}$ or key encryption key-minimum $1.8\times10^{19}$. On-chip key storage can be provided for key management and KEK's and TEK's. Key wrapping and unwrapping can occur with key updating and deterministic key generation and non-deterministic key generation. Typically the chip can be provided in an 80 pin TQFP package that is about 16 mm by 16 mm. It can be processor-controlled or operate in stand-alone operation.

The Sierra module's software programmability provides a low cost migration path for future upgrades to embedded communications equipment without the logistics and cost burden normally associated with upgrading hardware. The module provides a user the capability to remove the Type 1 functionality, allowing the device to be downgraded from a CCI device to an unclassified device.

The Sierra module's small size, low power and high data rates make it an ideal choice for battery sensitive applications. It is ideally suited for military radios, APCO Project 25 radios, wireless LAN's, remote sensors, guided munitions, UAV's and other equipment requiring a low power, programmable solution. The Sierra module is available as a complete, compact module, or as discrete parts for custom applications. The Sierra module is NSA certified and successfully embedded in multiple applications, for example, Motorola XTS™ 5000 Radio, BAE Systems JTRS 2C Radio, Harris SecNet 11 Secure Wireless LAN, key management modules, and others.

The Sierra II module is a second product in the Sierra family and incorporates the features of the Sierra I module. It offers data rates greater than 300 Mbps and low power consumption suitable for battery powered applications, legacy and future algorithm support and advanced programmability. It can support the requirements of the Joint Tactical Radio System (JTRS) and NSA's Crypto Modernization Program, including the requirement for programmability. The software programmability provides a low cost migration path for future upgrades to embedded communications equipment without the logistics and cost burden normally associated with upgrading hardware. These encryption modules have a small size, exhibit low power consumption, and have high data rates, making the modules an ideal choice for battery powered applications. They are especially suited for JTRS applications, military radios, wireless local area networks (LAN's), remote sensors, guided munitions, UAV's and other equipment requiring a low powered, programmable solution. The Sierra family of modules can be used with the cluster I cryptographic module and could create embeddable security modules for a cluster V platform.

The Sierra family of encryption modules has various cryptographic and other features. They are operable with Type 1, 3 and 4 cryptographic algorithms.

Type I cryptographic algorithms include:
 a) BATON/MEDLEY;
 b) SAVILLE/PADSTONE;
 c) KEESEE/CRAYON/WALBURN;
 d) GOODSPEED;
 e) ACCORDION;
 f) FIREFLY/Enhanced FIREFLY; and
 g) JOSEKI Decrypt.

Type 3 cryptographic algorithms include:
 a) DES, Triple DES;
 b) AES;
 c) Digital Signature Standard (DSS); and
 d) Secure Hash Algorithm (SHA).

Type 4 cryptographic algorithms include the CITADEL cryptographic engine that uses cryptographic algorithms based on a mixed-mode, arithmetic block cipher, which can provide half-duplex encryption and decryption at throughput rates up to 5 Mbps with serial or parallel unencrypted [ciphertext-CT] data.

Other algorithms can be added later. These encryption modules also have key management, which includes:
 a) SARK/PARK (KY-57, KYV-5 and KG-84A/C OTAR);
 b) DS-101 and DS-102 Key Fill;
 c) SINCGARS Mode 2/3 Fill; and
 d) Benign Key/Benign Fill.

Data rates can be up to 300 Mbps (depending on the mode), and the modules are available as ASIC and/or another module. A programmable cryptographic ASIC is available in two packages for various embedded applications. Package 1 is 280-ball µBGA (16 mm×16 mm), and package 2 is 608-ball BGA (31 mm×31 mm).

The operating temperature for these modules is about −40 degrees to +85 degrees C., and the supply voltage is about 1.8V (ASIC) or 3.3V (module). It has low power draw, making them especially applicable for battery powered applications. These modules are field software reprogrammable, have cryptographic bypass, and are non-CCI prior to Type 1 programming. The modules are designed to protect voice/data traffic up to TS/SCI.

The modules can be used in different applications such as: (a) all JTRS radio products (e.g., vehicular, manportable, handheld, airborne, etc.); (b) handheld and mobile law enforcement (battery powered) radios; (c) guided munitions and UAV applications; (d) telemetry and military sensor systems; (e) network interface cards and IP security products; (f) secure wireless networks (Harris SecNet products; (g) homeland security applications; and (h) next generation key management modules.

Another example of a cryptographic circuit that can be used with modification and upgraded by the present invention is a Sierra™ cryptography module, for example, also shown in FIG. 9 in U.S. published patent application no. 2002/0095594, the disclosure which is incorporated by reference in its entirety. The cryptography processor can be a Palisades ASIC, for example, as in the Sierra cryptography module. The cryptography circuit could include RAM and associated back-up battery and a field programmable gate array that can be programmed to produce various devices and logic blocks as appreciated by those skilled in the art.

Figure 5:
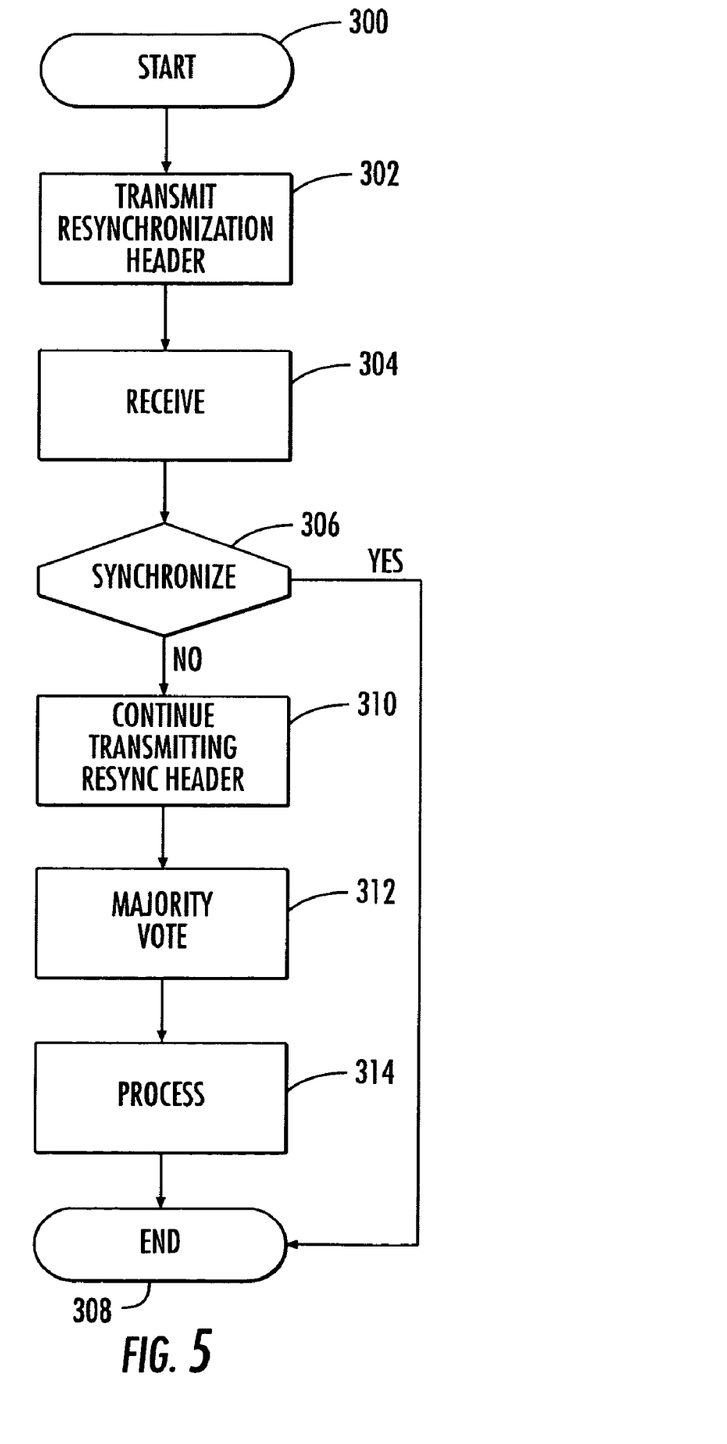
FIG. 5 is a high level flowchart showing an example of a method of the present invention.

A high level flowchart illustrating an example of the present invention is shown in FIG. 5. The process begins at block 300 and the resynchronization header is generated by a communications device. The header is transmitted (block 302) and received in another communications device (block 304). If synchronization occurs (block 306), the communications are now synchronized and the late-entry or fade-recovery condition overcome and the process of resynchronization finished. The header can still be transmitted, however (block 308). If synchronization does not occur, then the resynch header is continuously transmitted (block 310). Majority voting can occur (block 312) and further processing (block 314) until the process ends (block 308). Of course, no resynchronization may occur if the channel is noisy to an extent that resynchronization is impossible.

Figure 6:
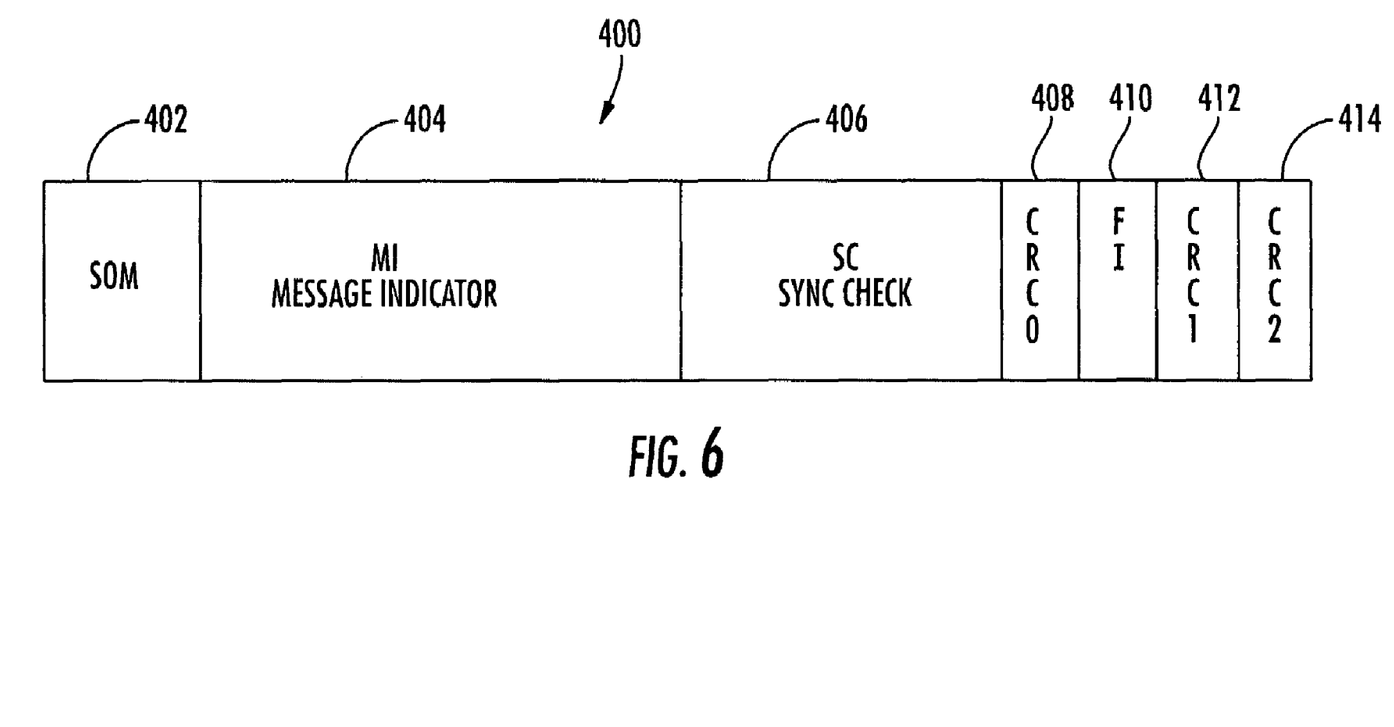
FIG. 6 is a block diagram of an example of a resynchronization header in accordance with the present invention.

In accordance with the present invention, the encrypted radio communications system allows cryptographic resynchronization can use repeated data, for example, nearly every second, to handle noisy channel conditions beyond 12-15% errors. Any resulting audio can be fixed at 1.6% worse than the channel regardless of the channel noise, without cascade or errors. An over-the-air 32-byte cryptographic resynchronize header 400 in one non-limiting example shown in FIG. 6 can include the following:

| | | |
|---|---|---|
| a) SOM | (4-bytes) | (402) |
| b) MI | (12-bytes) | (404) |
| c) SC | (8 bytes) | (406) |
| d) CRC0 | (2-bytes) | (408) |
| e) FI | (2-bytes) | (410) |
| f) CRC1 | (2-bytes) | (412) |
| f) CRC2 | (2-bytes) | (414) |

The acronyms above are defined as:

a) SOM is the Start-of-Message field pattern that includes voice or data message infotype;

b) MI is a Message Indicator field;

c) SC is the Synchronization Check field;

d) CRC0 is a first error correction field as a Cyclic Redundancy Check (CRC) computed over the Start-of-Message pattern, Message Indicator and Synchronization Check fields;

e) FI is the Frame Index field that counts the number of headers sent; and f) CRC1 and CRC2 are a second error correction field as two copies of a CRC computed on the Frame Index field.

It should be understood that although one header format is described in a non-limiting example, other formats can be used. Also, different error correction besides the cyclic redundancy check can be used.

The resynchronization mode is interoperable with regular Ciphertext (CT) by dummy encrypting it through Plaintext (PT) headers on the transmit side and dummy decrypting through Plaintext resynchronization headers on the receive side (even when the header information is not encrypted). This allows minimum error (MINERR) RESYNC radios, for example, to talk to or receive from mobile or other radios with regular Ciphertext. Typically, the header size is an even multiple of the Ciphertext block size, for example, 8 bytes or 4 words, as one non-limiting example.

The incrementing frame index integer can be majority voted. Normally, majority voting has multiple copies of what is supposed to be the same information. In the present invention, however, the "information" is an incrementing integer that may have some bit errors along with the frame index and Cyclic Redundancy Checks to validate the integer. The present invention can implement a "fast forward" algorithm to catch up cryptographic transmission security such that the receiver and transmitter can resynchronize based on the same cryptographic block.

Using the transmitted Message Indicator and Synchronization Check, and a saved copy of both, the system and method of the present invention determines late-entry from fade-recovery. A late-entry condition can be determined when the received Message Indication and Synchronization Check are different from the prior message, while a fade-recovery condition can be determined when the Message Indicator and Synchronization Check are the same. As a result, the system allows any fade-recovery to catch up more quickly, since the cryptographic (crypto) delta is shorter.

When a Cipher Text header is received with eleven copies of a Message Indicator and Synchronization Check with a channel error rate that results in the wrong result for the majority voted Message Indicator and Synchronization Check, normal Cipher Text communications fail. Minimum error RESYNC can take this incorrect majority voted Message Indicator and Synchronization Check to substitute for 11 frame headers and resynchronize eleven seconds faster than a normal late-entry. This will often result in synchronizing to within one to two seconds after the message has started, and will extend the range of normal Ciphertext.

The system of the present invention could use a short, for example, two-word, Start-of-Message pattern combined with Start-of-Message, Message Indicator, Synchronizing Check and Cyclic Redundancy Check to reduce computation. It need not depend entirely on a long Start-of-Message matching a criteria. This avoids computing not only the Cyclic Redundancy Check for every bit position to find the synchronizing Message Indicator and Synchronization Check, but also the longer seven word Start-of-Message that is used in Ciphertext. Two words also allows between nine to fourteen (9-14) bits of a Start-of-Message error out of 32, while maintaining manageable computation. Majority voting on the Start-of-Message, Message Indicator, Synchronization Check and Cyclic Redundancy Check block will eventually yield a Cyclic Redundancy Check match indicating that synchronization has been achieved. The Frame Index can then be determined. Improved table handling allows initial errors closer to 14. Table handling and cleanup handle the bit errors on input, and filter-out the entries when the table overflows. Those desired entries are not eliminated and resynchronization does not take longer.

The system preferably incrementally computes the majority vote and Cyclic Redundancy Check on the Start-of-Message, Message Indicator, Synchronization Check and Cyclic Redundancy Check. Subsequent computations do not need to rescan the input bits, and the resynchronization headers can be stored more compactly. The overhead of majority voting and Cyclic Redundancy Check generation is cut to validate headers, and the system is able to handle only "falsing" from the shortened Start-of-Memory.

The system of the present invention sends the resynchronization information for voice (overlaying CVSD), or data (currently overlaying, but could reduce channel bandwidth by enough to send resynchronization headers). An alternate way for voice transmission is to strip nibbles or bytes of silence over one second, such that the system gains 1.6% to fill the next header without overlaying "real" audio. The resynchronization headers also have transmitted voice/data infotype.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A synchronized communications system that permits resynchronization in late-entry or fade-recovery conditions, which comprises:

a plurality of communications devices which are operative for communicating in a synchronized encrypted communications channel between each other, wherein at least one of said communications devices continuously transmits a resynchronization header comprising, a start-of-message field that includes voice or data message infotype, a message indicator field, a synchronization check field, a first error correction field computed over the start-of-message/message indicator/synchronization fields, a frame index field, and a second error correction field computed on the frame index field and wherein at least one communications device stores data of prior transmitted message indicator fields and synchronization check fields and determines late-entry and fade-recovery conditions using recently received and stored message indicator fields and synchronization check fields, and determines a late-entry condition when a received message indicator field and synchronization check field are different from the prior stored message indicator field and synchronization check field and determines a fade-recovery condition when a received message indicator field and synchronization check field are the same as the prior stored message indicator field and synchronization check field.

2. A synchronized communications system according to claim 1, wherein said first error correction field comprises a cyclic redundancy check computed over the start-of-message/message indicator/synchronization fields.

3. A synchronized communications system according to claim 2, wherein said second error correction field comprises two copies of a cyclic redundancy check computed on the frame index field.

4. A synchronized communications system according to claim 3, wherein each cyclic redundancy check is 2 bytes.

5. A synchronized communications system according to claim 1, wherein said frame index field comprises an integer indicating the number of transmitted headers.

6. A synchronized communications system according to claim 1, wherein said start-of-message field is 4 bytes, said message indicator field is 12 bytes, said synchronization check field is 8 bytes, and said first error correction field is 2 bytes.

7. A synchronized communications system according to claim 1, wherein said second error correction field is 4 bytes.

8. A synchronized communications system according to claim 1, wherein said communications devices are operative for dummy encrypting through plaintext headers on a transmit side and dummy decrypting through plaintext resynchronization headers on a receive side.

9. A synchronized communications system according to claim 1, wherein said communications devices are operative for forming the resynchronization header as an even multiple of a ciphertext block size.

10. A synchronized communications system according to claim 1, wherein said communications devices are operative for majority voting a changing integer indicative of a frame index field, wherein a change function may be incrementing, decrementing, or any other mathematical function transforming a value into the next one in a series.

11. A synchronized communications system according to claim 10, wherein said communications devices are operative for incrementally computing a majority vote and error check to strengthen the data received over a noisy channel.

12. A synchronized communications system according to claim 1, wherein said communications devices are operative for incrementing an integer along with frame index error corrections to validate an integer within the frame index field.

13. A method of resynchronizing encrypted communications between communications devices in late-entry or fade-recovery conditions, which comprises:
continuously transmitting a resynchronization header from one of the communications devices to another communications device, wherein the resynchronization header comprises:
a start-of-message field that includes voice or data message infotype,
a message indicator field,
a synchronization check field,
a first error correction field computed over the start-of-message/message indicator/synchronization,
a frame index field, and
a second error correction field computed on the frame index; and
synchronizing communication between the communications devices based on a received resynchronization header by storing in at least one communications device data of prior transmitted message indicator fields and synchronization check fields and determining late-entry and fade-recovery conditions using recently received and stored message indicator fields and synchronization check fields, and further comprising determining a late-entry condition when a received message indicator field and synchronization check field are different from the prior stored message indicator field and synchronization check field and determining a fade-recovery condition when a received message indicator field and synchronization check field are the same as the prior stored message indicator field and synchronization check field.

14. A method according to claim 13, which further comprises dummy encrypting through plaintext headers on a transmit side and dummy decrypting through plaintext resynchronization headers on a receive side.

15. A method according to claim 13, which further comprises forming the resynchronization header as an even multiple of a ciphertext block size.

16. A method according to claim 13, which further comprises majority voting an integer indicative of a frame index field.

17. A method according to claim 13, which further comprises incrementally computing a majority vote and error check.

18. A method according to claim 13, which further comprises computing a cyclic redundancy check over the start-of-message/message indicator/synchronization check fields to form the first error correction field.

19. A method according to claim 18, which further comprises computing a cyclic redundancy check on the frame index field to form the second error correction field as two copies of the computed cyclic redundancy check.

20. A method according to claim 19, which further comprises forming each cyclic redundancy check as 2 bytes.

21. A method according to claim 13, which further comprises indicating the number of transmitted headers by the frame index field.

22. A method according to claim 13, which further comprises forming the start-of-message field as 4 bytes, the message indicator field as 12 bytes, the synchronization check field as 8 bytes, and the first error correction field as 2 bytes.

23. A method of communicating, which comprises generating at a communications device a communications signal that includes a cryptographic resynchronization header that permits resynchronization in late-entry or fade-recovery conditions, wherein the cryptographic resynchronization header includes:
a start-of-message field that includes voice or data message infotype;
a message indicator field;
a synchronization check field;
a first error correction field computed over the start-of-message/message indicator/synchronization field;
a frame index field; and
a second error correction field computed on the frame index, the method further comprising transmitting the communications signal to another communications device over a synchronized encrypted communications channel, and wherein at least one communications device stores data of prior transmitted message indicator fields and synchronization check fields and determines late-entry and fade-recovery conditions using recently received and stored message indicator fields and synchronization check fields, and determines a late-entry condition when a received message indicator field and synchronization check field are different from the prior stored message indicator field and synchronization check field and determines a fade-recovery condition when a received message indicator field and synchronization check field are the same as the prior stored message indicator field and synchronization check field.

24. The method according to claim 23, wherein said first error correction field comprises a cyclic redundancy check computed over the start-of-message/message indicator/synchronization.

25. The method according to claim 24, wherein said second error correction field comprises two of a cyclic redundancy check computed on the frame index field.

26. The method according to claim 25, wherein each cyclic redundancy check is 2 bytes.

27. The method according to claim 23, wherein said frame index field comprises a changing integer indicating the number of transmitted headers.

28. The method according to claim 23, wherein said start-of-message field is 4 bytes, said message indicator field is 12 bytes, said synchronization check field is 8 bytes, and said first error correction field is 2 bytes.

29. The method according to claim 23, wherein said second error correction field is 4 bytes.

* * * * *